(12) United States Patent
Morrish

(10) Patent No.: US 6,911,959 B1
(45) Date of Patent: Jun. 28, 2005

(54) LOW COST HORIZONTAL BAR INDICATOR SYSTEM FOR ON SCREEN DISPLAYS

(75) Inventor: Andy Morrish, Saratoga, CA (US)

(73) Assignee: National Semiconductor Corporation, Santa Clara, CA (US)

(*) Notice: Subject to any disclaimer, the term of this patent is extended or adjusted under 35 U.S.C. 154(b) by 706 days.

(21) Appl. No.: 09/907,844

(22) Filed: Jul. 17, 2001

(51) Int. Cl.[7] .................................................. G09G 3/04
(52) U.S. Cl. ...................... 345/35; 348/569; 340/815.4; 340/815.78; 340/815.79
(58) Field of Search .................... 345/35–40; 340/815.4, 340/815.78, 815.79; 348/569, 570

(56) References Cited

U.S. PATENT DOCUMENTS

| | | | | |
|---|---|---|---|---|
| 5,373,308 A | * | 12/1994 | Kurisu et al. | 345/35 |
| 5,528,255 A | * | 6/1996 | Hagimori | 345/35 |
| 5,598,176 A | * | 1/1997 | Klingenfus | 345/35 |
| 5,874,930 A | * | 2/1999 | McRobert et al. | 345/44 |
| 5,995,162 A | * | 11/1999 | Fujimori | 348/569 |
| 6,348,952 B1 | * | 2/2002 | Jeong | 348/569 |

* cited by examiner

Primary Examiner—Henry N. Tran
(74) Attorney, Agent, or Firm—Timothy P. Sullivan; Merchant & Gould

(57) ABSTRACT

The present invention provides a bar indicator that minimizes the burden placed on the microcontroller. A horizontal bar indicator is generated that requires very little microcontroller firmware overhead, allowing a less powerful microcontroller to be used in the application. The reduced firmware requirement translates into smaller microcontroller firmware ROM requirements, thus enabling a lower cost system to be realized. The bar indicator uses a single byte written to a counter to represent the size of the bar. This byte written to the counter is readily available from the actual parameter value representing the size of the bar without significant additional calculation. The OSD video coming from the OSD logic is overridden with a pixel overwrite when the location of the bar indicator is located. The bar overwrites whatever is located at the position of the bar indicator. The pixel override occurs for a predetermined time. For example, if the bar indicator is set to the maximum range then the time may be twice as long as compared to the time to display a bar indicator that is set to at 50% of the range.

18 Claims, 12 Drawing Sheets

LOW COST HORIZONTAL BAR INDICATOR SYSTEM FOR ON SCREEN DISPLAYS

FIELD OF THE INVENTION

The present invention is related to electronics, and more specifically to an electronic circuit for an on screen to display a horizontal bar indicator.

BACKGROUND OF THE INVENTION

Many computers, televisions, and other equipment use on screen displays (OSDs) to display and adjust parameters related to the equipment. For example, OSDs may visually represent the level of volume, contrast, brightness, vertical position, horizontal position, and the like. While the user is adjusting the parameter, the OSD provides visual feedback to the user relating to the adjustment they are performing.

One common method of visual feedback employed in OSDs is to generate a bar indicator to show a parameter's level. A bar indicator typically shows the range of adjustment the parameter may be adjusted within as well as the current value of the parameter. For example, a bar indicator may be used to display a volume parameter.

A common technique for displaying a bar indicator within an OSD is to display characters on a display screen of the equipment. Such an OSD system is referred to as a character based system. In such an OSD system, several characters are typically used to represent portions of the OSD. For example, some characters are used to represent a background and several different characters are used to represent segments of a bar indicator. One such prior art system is illustrated in FIGS. 1A–1C.

FIG. 1A illustrates a prior art bar indicator. As shown in the figure, the bar indicator has a range between 0 and 255 and utilizes twelve separate characters (C1–C12) to represent the range. Within this particular example, the bar indicator is set at approximately 135 out of 255.

As can be seen by referring to FIG. 1A, each character represents a fraction of the bar indicator. In this particular example, each character represents 1/12 of the bar indicator.

FIG. 1B shows ten different icon characters each representing a different level. According to the present example, icon 1 shows all of the pixels within the character filled, representing a full bar indicator. Icon 2 shows 90% of the character filled. Icon 3 shows 80% of the character filled. Icon 4 shows 70% of the character filled. Icon 5 shows 60% of the character filled. Icon 6 shows 50% of the character filled. Icon 7 shows 40% of the character filled. Icon 8 shows 30% of the character filled. Icon 9 shows 20% of the character filled, and icon 10 shows 10% of the character filled. The icons are selected based on the value of the parameter to be displayed by the bar indicator.

FIG. 1C shows the bar indicator characters spaced sufficiently to indicate the individual characters comprising the bar indicator. As shown in the figure, the bar indicator is made up of twelve separate characters (C1–C12). To facilitate the effect of a moving bar indicator, a microcontroller runs a firmware routine that takes the parameter value, as the ratio of the maximum value, and finds the closest number of whole characters and remaining pixels that fall over to another character within the bar indicator. For illustration, suppose the parameter value displayed by the bar indicator is 135, and the bar graph is composed of 12 character segments, each segment being 12 pixels wide. In order to display the bar indicator the appropriate size, the microcontroller illuminates the left most pixels of the indicator according to the following formula: Illuminated pixels=135/256*12 segments*12 pixels=76 pixels. According to the present example, seventy-six pixels should be illuminated to show a parameter value of 135.

Seventy-six pixels can be illuminated by the following method. First, an icon filled 100% (See icon 1 in FIG. 1B) is chosen for the first six characters in the bar indicator (6*12=72 pixels). Second, an icon that is closest to having four out of the twelve pixels illuminated in one color, and the remaining eight in another background color is chosen. Third, the final five characters remaining of the bar indicator are chosen such that they are in the background color and are not filled.

As can be seen by the above example, the microcontroller converts the value of the parameter to a bar indicator. In order to achieve this, the microcontroller determines each character to place within the bar indicator to show the parameter.

When the bar indicator is at its maximum value, the microcontroller places solidly colored icons in each character position of the bar indicator. When partial values need to be converted a burden is placed on the microcontroller. The microcontroller slices the icon into fragments and then chooses the character based on the desired size of the bar. The microcontroller also has to decide what remnant is left and then use the character remnant. This requires a large amount of overhead on the microcontroller.

The calculation to determine the characters required for displaying the bar the appropriate size requires significant mathematical computation. Moreover, the calculations are often performed by low power microcontrollers using extensive look-up tables. The firmware to provide this feature is quite large, takes up significant ROM space, and uses significant computation power.

SUMMARY OF THE INVENTION

The present invention is directed at providing a bar indicator system that minimizes the burden placed on the microcontroller. A horizontal bar indicator can be generated that requires very little microcontroller firmware overhead, allowing a less powerful microcontroller to be used in the application. The reduced firmware requirement translates into smaller microcontroller firmware ROM requirements, thus enabling a lower cost system to be realized.

According to one aspect of the invention, the bar indicator uses a single byte written to a counter to represent the size of the bar. This byte written to the counter is readily available from the actual parameter value representing the size of the bar without significant additional calculation. For example, if an eight-bit value is sent that represents the value then that value may be used directly. Alternatively, the eight-bit value may be converted to a five-bit value, or some other representative value.

According to yet another aspect of the invention, the OSD video coming from the OSD logic is overridden with a pixel overwrite when the starting position of the bar indicator is located. The bar indicator overwrites whatever is located below the position of the bar indicator.

According to another aspect of the invention, the pixel overwrite occurs for a predetermined time duration. For example, if the bar indicator is set to the maximum range then the predetermined time duration may be twice as long as compared to the time to display a bar indicator that is set to at 50% of the range.

According to still yet another aspect of the invention, the OSD circuit uses less firmware than a character-based system. The character row and pixel location for the start of the bar indicator start position is located. A timer is used to time the duration of the pixel overwrite. During the period the timer is active, the green, blue, and red video is not selected from the OSD logic. Instead, a predetermined color is drawn on the display.

DETAILED DESCRIPTION OF THE PREFERRED EMBODIMENT

Figure 1A:
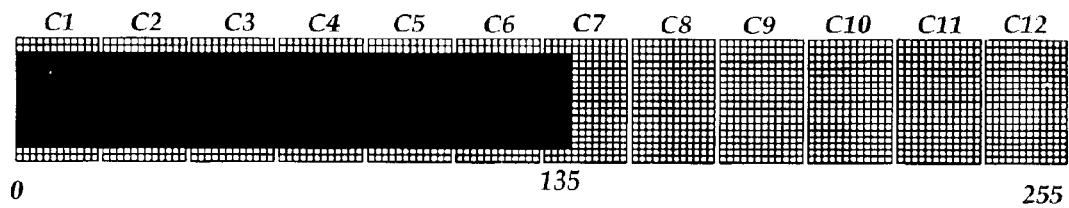
FIGS. 1A–1C illustrate schematic diagrams of a prior art OSD bar indicator.
Figure 1B:
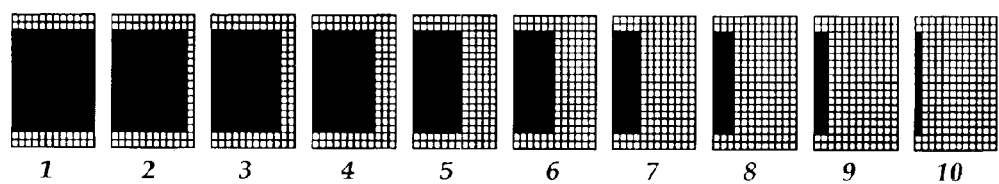
Figure 1C:
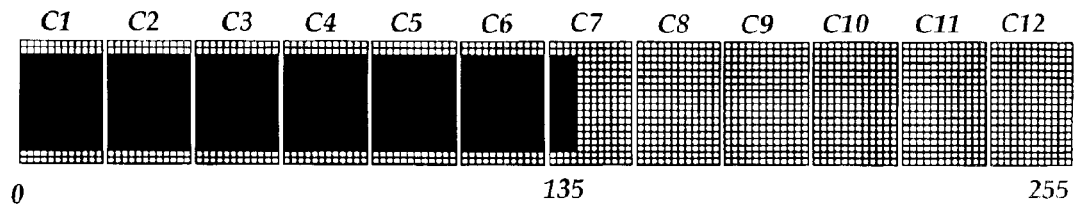

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "connected" means a direct electrical connection between the items connected, without any intermediate devices. The term "coupled" means a direct electrical connection between the items connected, or an indirect connection through one or more passive or active intermediary devices. The term "circuit" means either a single component or a multiplicity of components, either active and/or passive, that are coupled to provide a desired function. The term "signal" means at least one current, voltage, or data signal. Referring to the drawings, like numbers indicate like parts throughout the views.

Briefly described, the present invention is directed at generating a horizontal bar indicator within an area of an OSD frame. According to one embodiment, an area enclosing the bar indicator within the OSD frame is filled with a dark background color and an area within the dark background is overwritten for a predetermined period of time with a lighter color representing the bar indicator.

Figure 2:
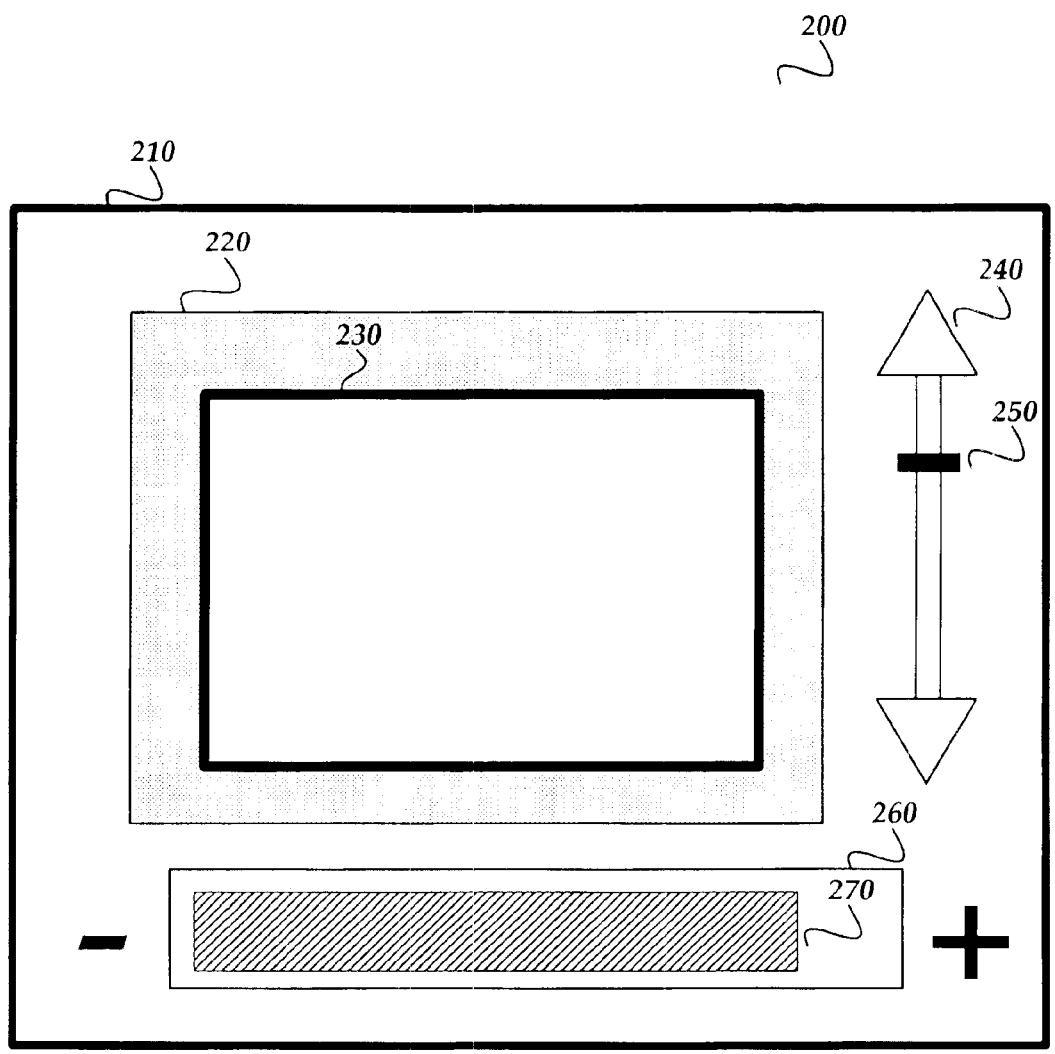
FIG. 2 shows an exemplary diagram of an OSD frame.

FIG. 2 shows an exemplary diagram of an OSD frame, according to one embodiment of the invention. As shown in the figure, OSD frame 200 includes frame 210, screen frame 220, programmable area 230, vertical bar 240, vertical bar indicator 250, horizontal bar frame 260, and horizontal bar indicator 270.

Frame 210 encloses screen frame 220, programmable screen 230, vertical bar 240, vertical bar indicator 250, horizontal bar frame 260, and horizontal bar indicator 270. Screen frame 220 encloses programmable area 230. Vertical bar indicator 250 is positioned along vertical bar 240, and horizontal bar indicator 270 is located and sized to be within horizontal bar frame 260.

According to one embodiment of the invention, OSD frame 200 is a 6×5 character matrix, is preprogrammed within the device, and is static. The OSD frame may be turned on or off by an external command from the microcontroller. Each of the characters within the OSD is an 8×8 pixel cell and may use up to four colors. For example, according to one embodiment, within a simple OSD device, OSD frame 200 appears as shown in the figure. As OSD frame 200 is preprogrammed, the microcontroller stores and sends only minimal information at power up regarding the size and position of simple OSD frame 200 on the displayed screen, and is thereafter simply turned on or off by writing to one register. According to another embodiment, the OSD frame may be dynamic and change based on the parameter being adjusted.

The simple OSD frame shows the user basic views of the functions that are the subject of the interface. According to the present example, which is designed for computer display applications, OSD frame 200 gives the user the appearance of a computer screen. As will be appreciated, many other OSD frames may be designed. For example, the OSD frame may give the appearance of a phone, a television, or any other device consistent with the application. Within screen frame 220 is programmable area 230. Programmable area 230 allows substitution of up to six different characters. Other sizes may be chosen for programmable area 230. According to one embodiment, up to sixteen different adjustment icons (See FIGS. 11 and 12 for representative icons) may be displayed within the programmable area to provide the user with information about the selected function. In this way, the same basic information that may be presented through a conventional non-OSD approach, where the same basic icons may have either been printed or embossed on the bezel of the device, may be shown in the OSD. The icons may be chosen in many different ways. For example, a bit code may be sent to the OSD that maps the appropriate icons into programmable area 230 without external intervention by the microcontroller.

As will be appreciated in view of the present disclosure, the size, shape, and color of the frame and the icon space may be different between applications, but the same general concept may be applied as in the present example, which is described herein only as an illustration of the invention.

Figure 3:
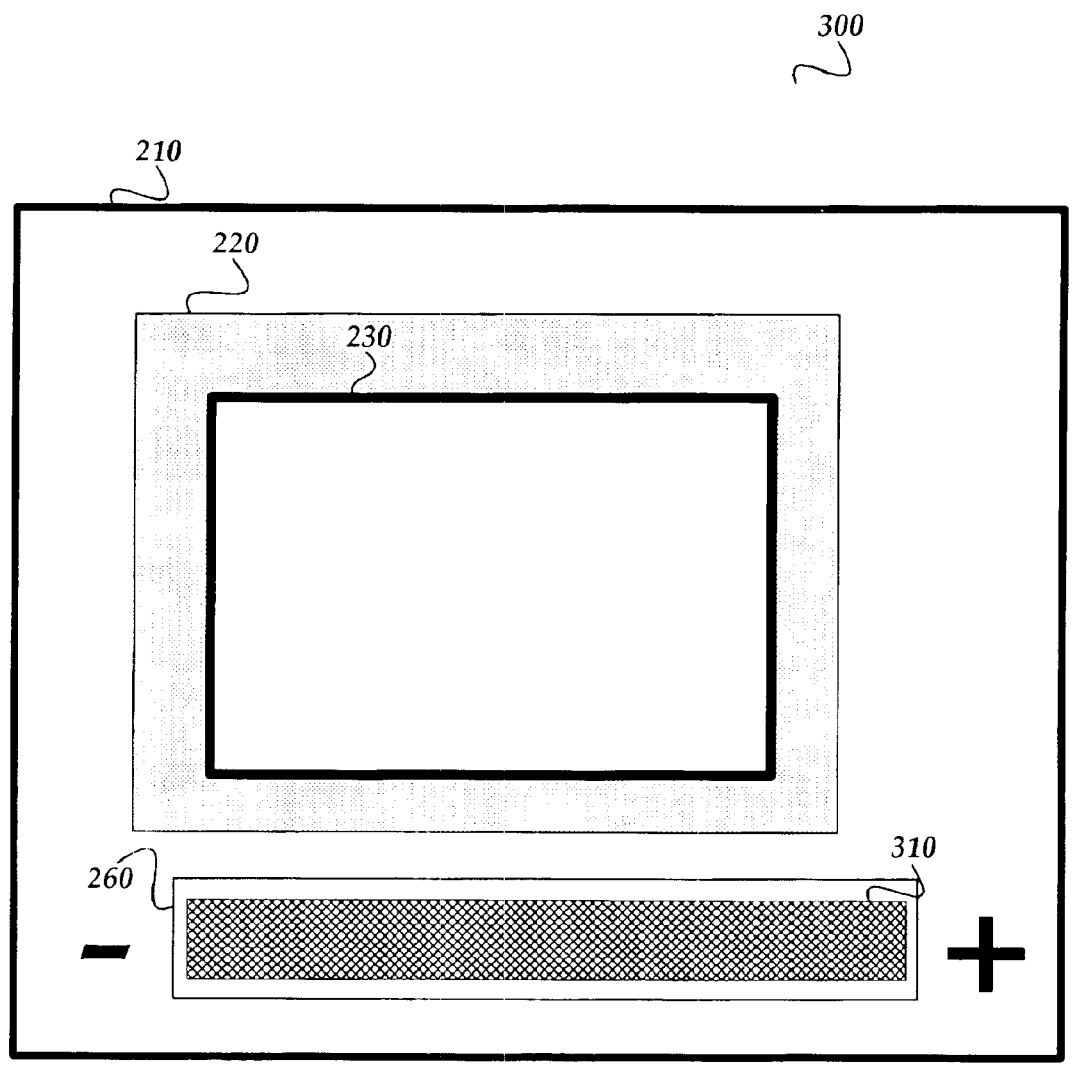
FIG. 3 illustrates a schematic diagram of an OSD frame and a pixel overwrite area.

FIG. 3 illustrates an exemplary OSD frame for displaying a horizontal bar indicator, according to one embodiment of the invention. FIG. 3 is substantially similar to FIG. 2. However, FIG. 3 includes pixel overwrite area 310 and does not show vertical bar 240, vertical bar indicator 250, or horizontal bar indicator 270.

Horizontal bar frame 260 encloses pixel overwrite area 310. Horizontal bar frame 260 is drawn by the OSD and is preprogrammed. According to one embodiment, horizontal bar frame 260 is filled with a darker background color than the horizontal bar indicator. According to another embodiment, a background frame to enclose the bar indicator is not used. Instead, the bar indicator is drawn without the frame. Other frames enclosing the bar indicator may also be used. For example, the enclosing frame may be longer, wider, or be a different color than the enclosing frame illustrated in the figure. Horizontal bar indicator 270 is displayed and is described in conjunction with the figures below.

Pixel overwrite area 310 is the area that is overwritten by a predetermined color to display horizontal bar indicator 270 (FIG. 2). According to one embodiment, pixel overwrite area 310 starts at the location column 1 row 4 of the OSD frame and is 31 pixels long. As will be appreciated the size of the pixel overwrite area may be set to any area within the OSD based upon the specific application.

Figure 4:
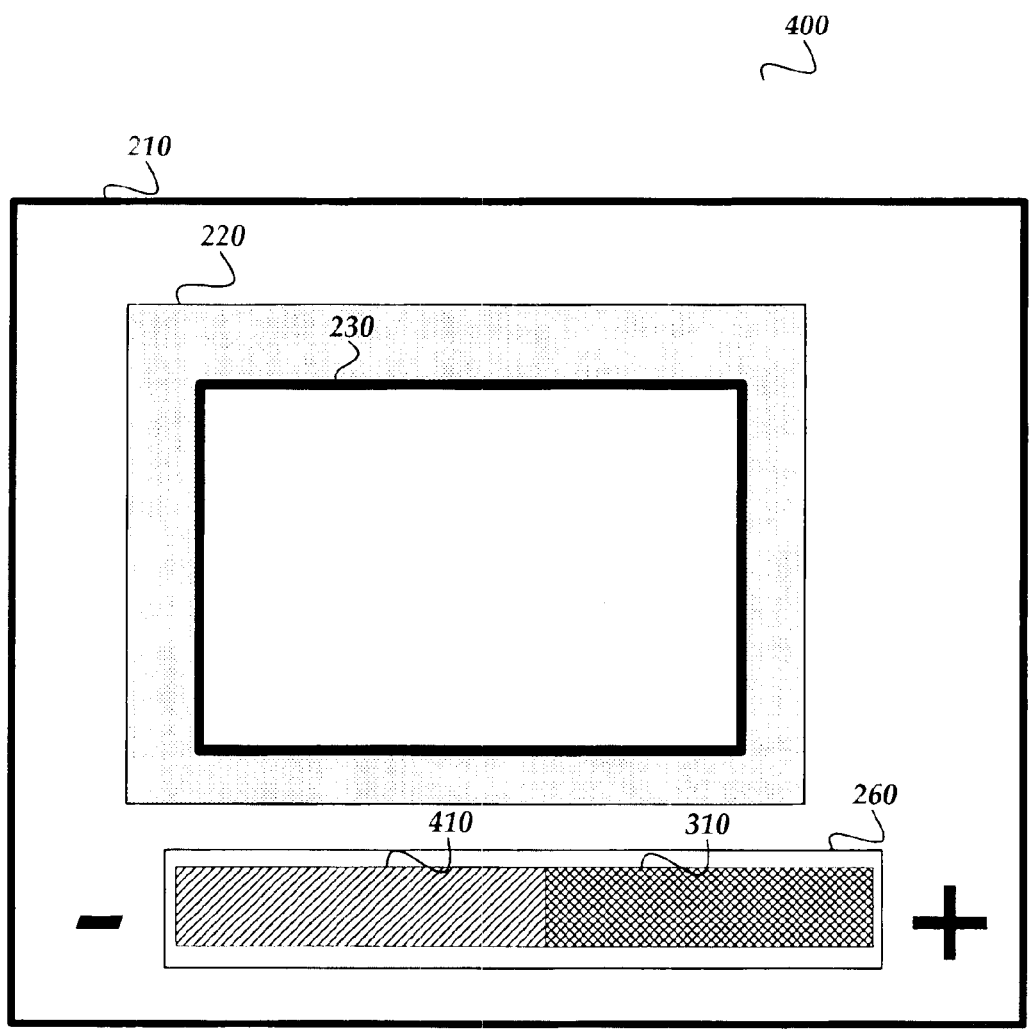
FIG. 4 illustrates a schematic diagram of an OSD with the horizontal bar indicator at one parameter value within the pixel overwrite area.

FIG. 4 illustrates a schematic diagram of an OSD with the horizontal bar indicator at one parameter value within the pixel overwrite area, according to one embodiment of the invention. FIG. 4 is substantially similar to FIG. 3. However, OSD system 400 includes horizontal bar indicator 410. As shown in the figure, the diagram includes a horizontal bar indicator showing the parameter value at about 50% of its maximum value.

When the user adjusts a given parameter associated with the bar indicator, the bar indicator appears to move in response to the change in value. For example, if the bar indicator is a horizontal bar indicator the bar indicator appears to move left or right depending on the adjustment the user is making. When the user adjusts the parameter to a larger value, the bar indicator typically moves to the right, and when the parameter value is decreased, the bar indicator moves to the left. If the bar indicator is a vertical bar indicator the bar indicator appears to move up or down in response to the change in value for the parameter. No bar indicator is shown when the parameter's value is zero. At the maximum value of the range, however, it appears that the bar indicator fills the entire range.

Figure 5:
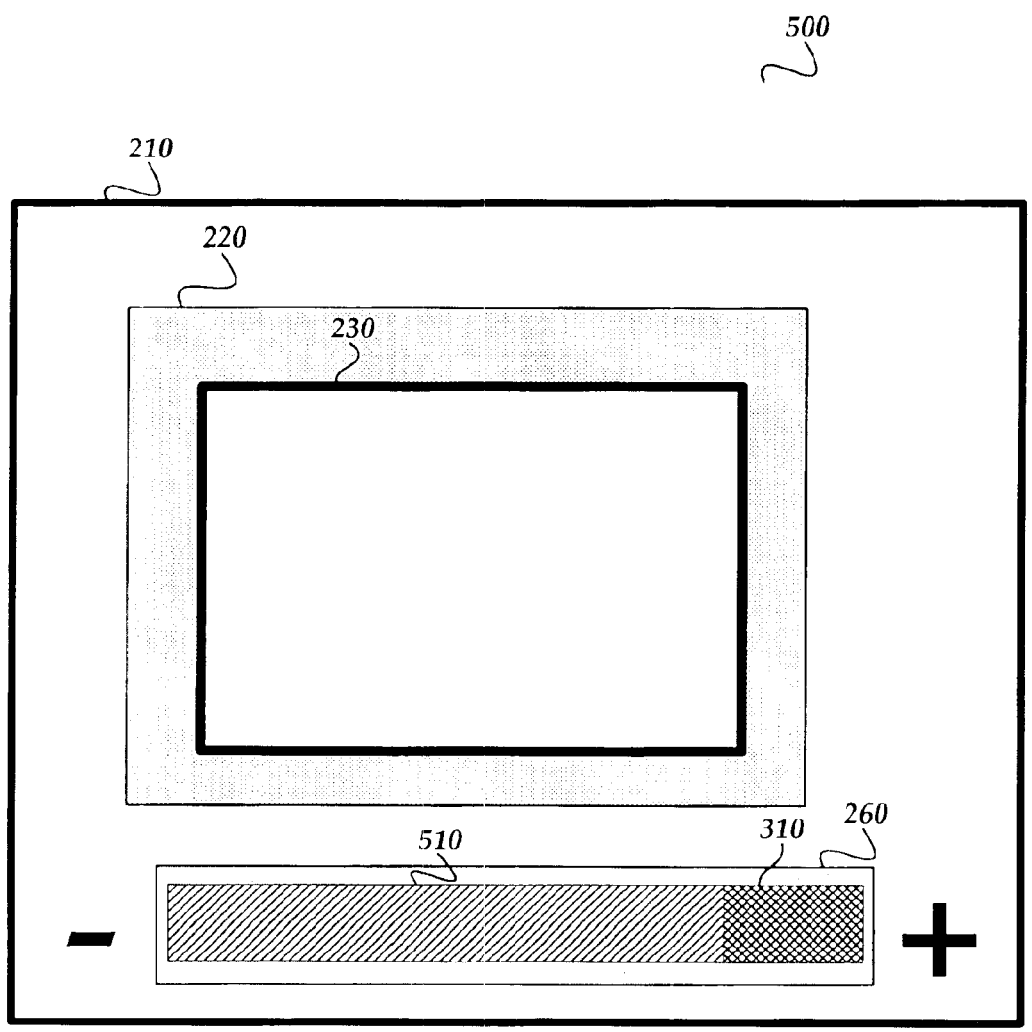
FIG. 5 illustrates a schematic diagram of an OSD with the horizontal bar indicator at another parameter value within the pixel overwrite area.

FIG. 5 illustrates a schematic diagram of a horizontal bar indicator of an OSD representing a parameter value, according to one embodiment of the invention. FIG. 5 is substantially similar to FIG. 4. However, OSD system 500 includes horizontal bar indicator 510. As shown in the figure, the diagram includes a horizontal bar indicator showing the parameter value at about 80% of its maximum value.

Figure 6:
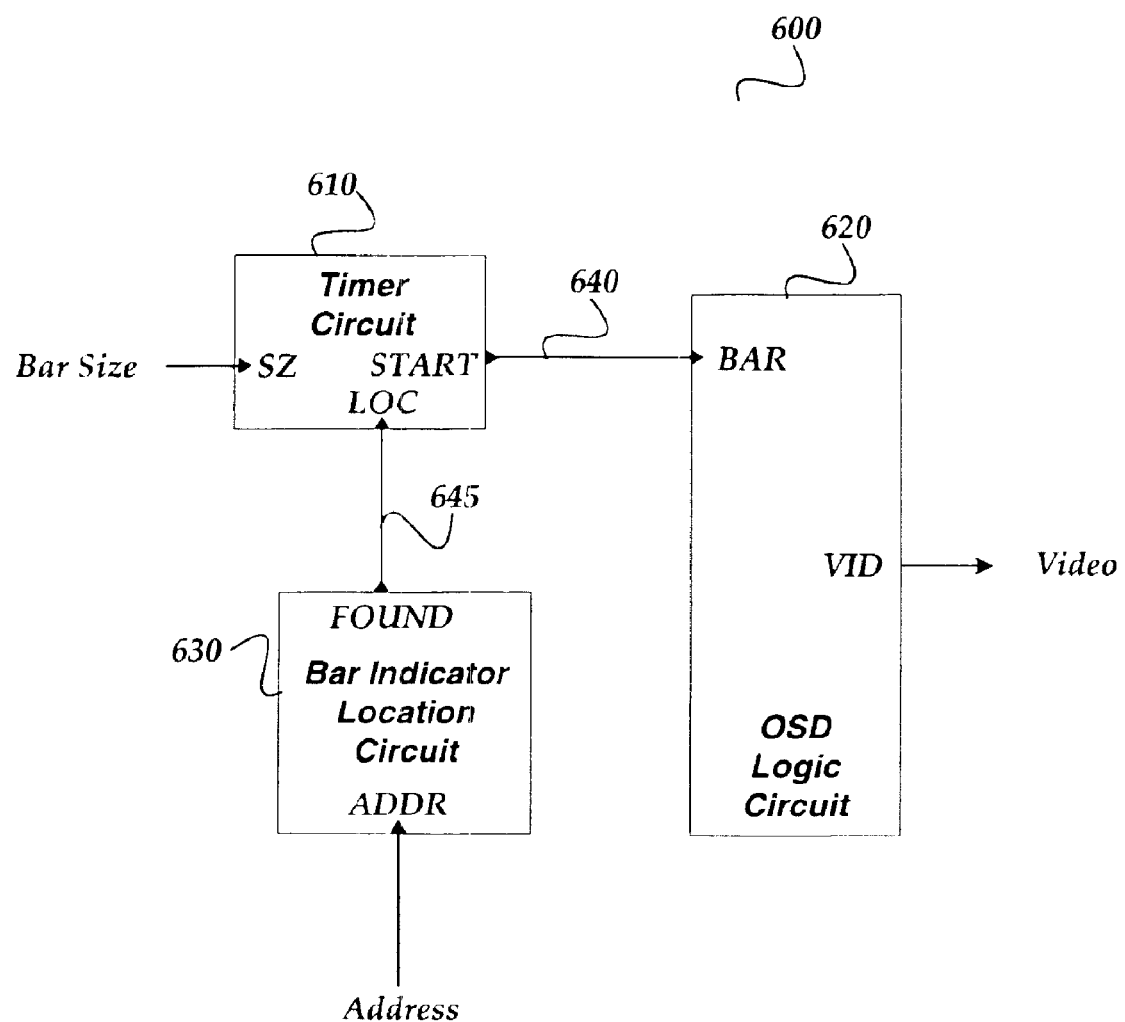
FIG. 6 shows an overview schematic diagram of an OSD bar indicator system.

FIG. 6 shows an overview schematic diagram of an OSD bar indicator system, according to one embodiment of the invention. As shown in the figure, OSD bar indicator system 600 includes timer circuit 610, OSD logic circuit 620, and bar indicator location circuit 630.

Timer circuit 610 includes a SZ input coupled to a bar size signal, a LOC input coupled to node 645, and a START output coupled to node 640. Bar indicator location circuit 630 includes an ADDR input coupled to an address signal and a FOUND output coupled to node 645. OSD logic circuit 620 includes a BAR input coupled to node 640 and a video output (VID).

Bar indicator location circuit 630 is arranged to receive the address signal and determine the location, or address, of what is currently being drawn to the display. When the address of the location where the bar indicator is to be drawn is reached, bar indicator location circuit 630 is arranged to provide a found signal at node 645. Bar indicator location circuit 630 is programmed to produce the found signal at node 645 when the location of the bar indicator is drawn. The location of the bar indicator may change based on applications. Additionally, more than one bar indicator may be displayed within the OSD.

Timer circuit 610 sets a counter in response to the bar size signal received at input SZ. The counter is set such that the number of horizontal pixels matching the size of the bar indicator is drawn on the OSD. If the bar size signal at the SZ input of timer circuit 610 is zero then no visible bar indicator will be displayed and the counter will be set to zero. On the other hand, if the bar size signal indicates a maximum sized bar indicator, the bar indicator is displayed at its maximum size and the counter will be set to a maximum time count. According to one embodiment, the maximum size for the bar indicator is 31 pixels long. As will be appreciated, the counter may be set to count more or less time in order to display more or less pixels.

When timer circuit 610 receives the found signal, timer circuit 610 produces a start signal at node 640, and begins counting to the predetermined time determined from the bar size signal. Timer circuit 510 produces a high (logical "1") start signal at node 640 as long as the timer is running.

OSD logic circuit 620 is arranged to receive the start signal. During the time OSD logic circuit 620 receives the high start signal, the OSD logic is overridden and the bar indicator is drawn. More specifically, when the start signal is high, the logic sets a pixel overwrite output high forcing the video output (VID) to a specific color. According to one embodiment, the pixel overwrite color used for the bar indicator is bright green. When the start signal is low (logical "0"), the OSD logic is not overridden and the OSD video is output.

Figure 7:
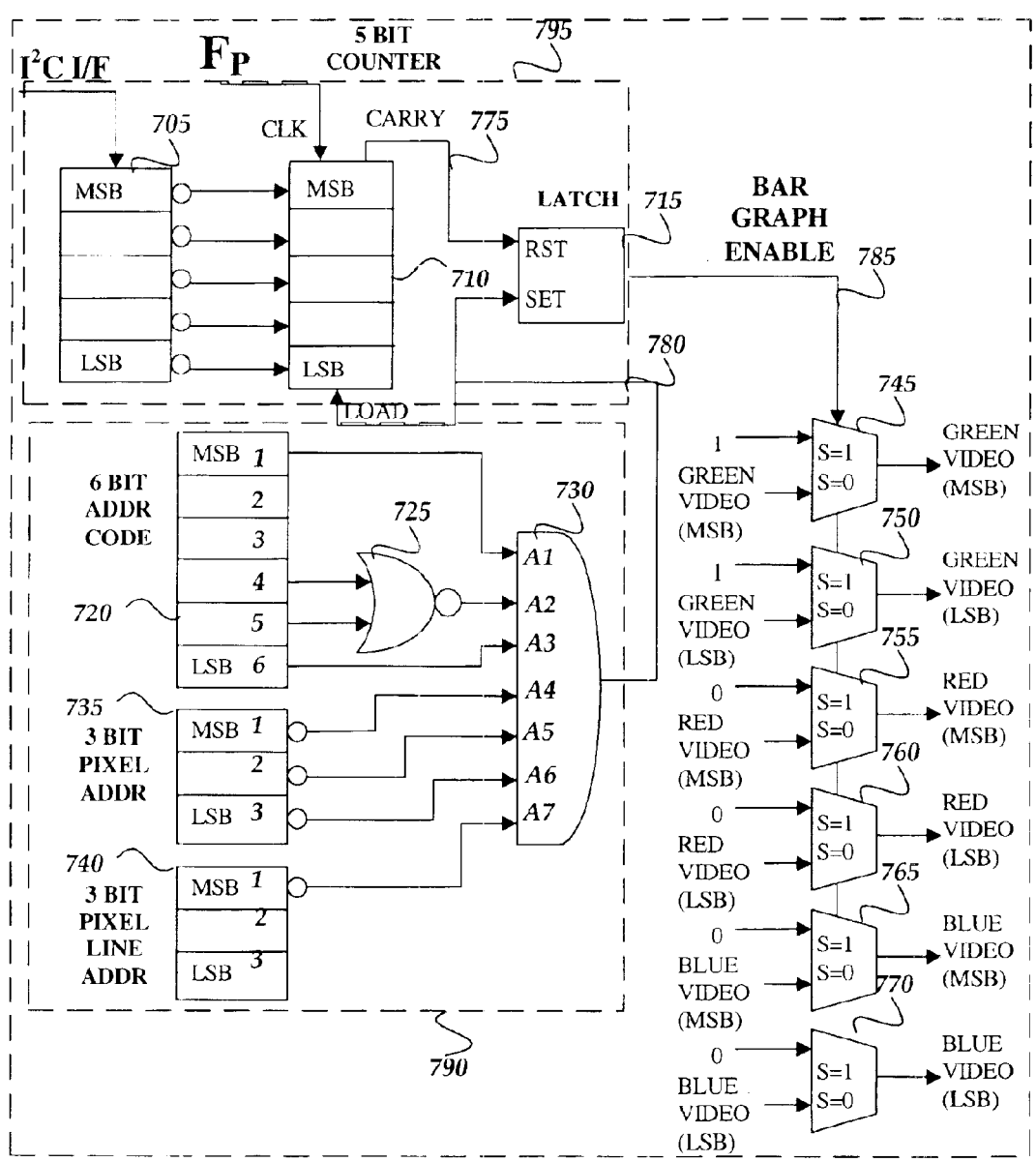
FIG. 7 shows a schematic diagram of an OSD bar indicator system.

FIG. 7 shows a schematic diagram of an OSD bar indicator system, according to one embodiment of the invention. As shown in the figure, OSD bar indicator system 700 includes timer circuit 795, address circuit 790 and selectors 745, 750, 755, 760, 765, and 770. Timer circuit 795 includes bar size bit storage 705, counter 710, and latch 715. Address circuit 790 includes 6 bit address code 720, NOR gate 725, AND gate 730, 3 bit pixel address 735, and 3 bit pixel line address 740. FIG. 7 is shown for exemplary purposes only and is not intended to be limiting. As will be appreciated in view of the present disclosure, many other OSD bar indicator systems may be implemented.

Bar size bit storage 705 has an input for receiving a bar size signal and outputs for outputting each bit representing the bar size. Counter 710 has a clock input, a load input coupled to node 780, bar size inputs coupled to each bit representing the bar size, and an output coupled to node 775. Latch 715 has a RST input coupled to node 775, a set input coupled to node 780, and a bar graph enable output coupled to node 785.

NOR gate 725 has an input coupled to bit 4 and an input coupled to bit 5 of 6 bit address code 720, respectively. AND gate 730 has seven inputs (A1–A7). A1 is coupled to the most significant bit (MSB 1) from six bit address code 720. A2 is coupled to the output of NOR gate 725. A3 is coupled to the least significant bit (LSB 6) of six bit address code 720. A4 is coupled to the most significant bit (MSB 1) of three-bit pixel address 735. A5 is coupled to the second bit (bit 2) of three bit pixel address 735. A6 is coupled to the least significant bit (LSB 3) of three bit pixel address 735. A7 is coupled to the most significant bit (MSB 1) of three bit pixel line address 740. The output of AND gate 730 is coupled to node 780.

Selectors 745–770 each have an input coupled to node 785, respectively, and two inputs that each receives a video signal. Selector 745 has an input for receiving a MSB green video signal, an input for receiving an override video signal, a select input coupled to node 785, and a green video signal output. Selector 750 has an input for receiving a LSB green video signal, an input for receiving an override video signal, a select input coupled to node 785, and a green video signal output. Selector 755 has an input for receiving a MSB red video signal, an input for receiving an override video signal, a select input coupled to node 785, and a red video signal output. Selector 760 has an input for receiving a LSB red video signal, an input for receiving an override video signal, a select input coupled to node 785, and a red video signal output. Selector 765 has an input for receiving a MSB blue video signal, an input for receiving an override video signal, a select input coupled to node 785, and a blue video signal output. Selector 770 has an input for receiving a LSB green video signal, an input for receiving an override video signal, a select input coupled to node 785, and a blue video signal output.

Address circuit 790 determines when the bar indicator start position has been reached by the OSD logic. 6 bit address code 720 looks for a particular frame address location. 3 bit pixel address 735 looks for a particular pixel to start on within the cell, and 3 bit pixel line address looks for a particular line within the pixel cell. According to one embodiment, the start position for the bar indicator is the first character of the last row within the OSD frame. The pixel overwrite area for the bar indicator is the first four lines in the last character row within the OSD frame. As will be appreciated many other locations within the OSD frame may serve as a starting location. Additionally, other addressing systems or systems may be used to determine where to draw the bar indicator.

When the starting location of the bar indicator is found, AND gate 730 is arranged to produce a high (logical "1") signal at node 780. In response to the high signal at node 780, counter 710 is loaded with the bits from bar size bit storage 705 and latch 715 is set. Counter 710 begins counting. While counter 710 is counting, latch 715 produces a high bar graph enable signal at node 785. When the signal at node 785 is high, the OSD logic is overridden and the bar indicator is drawn in the pixel overwrite area. More specifically, during the time the bar graph enable signal at node 785 is high, selectors 745–770 output the override video signal. In other words, the green, blue, and red video from the OSD logic is not selected during this time. According to one embodiment of the invention, bright green is used as the bar indicator color. Therefore, according to the particular example, selectors 745 and 750 are the only selectors outputting the override video. As will be appreciated any color may be used.

When the bar value has been reached, counter 710 resets latch 715, thus reverting the displayed bar to its normal background color. In this way, the function the bar indicator can be simply creating, requiring extremely low overhead from the microcontroller compared to conventional OSD devices.

While the bar indicator is solid according to this embodiment, it will be appreciated that the bar indicator does not have to be solid. The bar could be striped, or have varying patterns.

Figure 8:
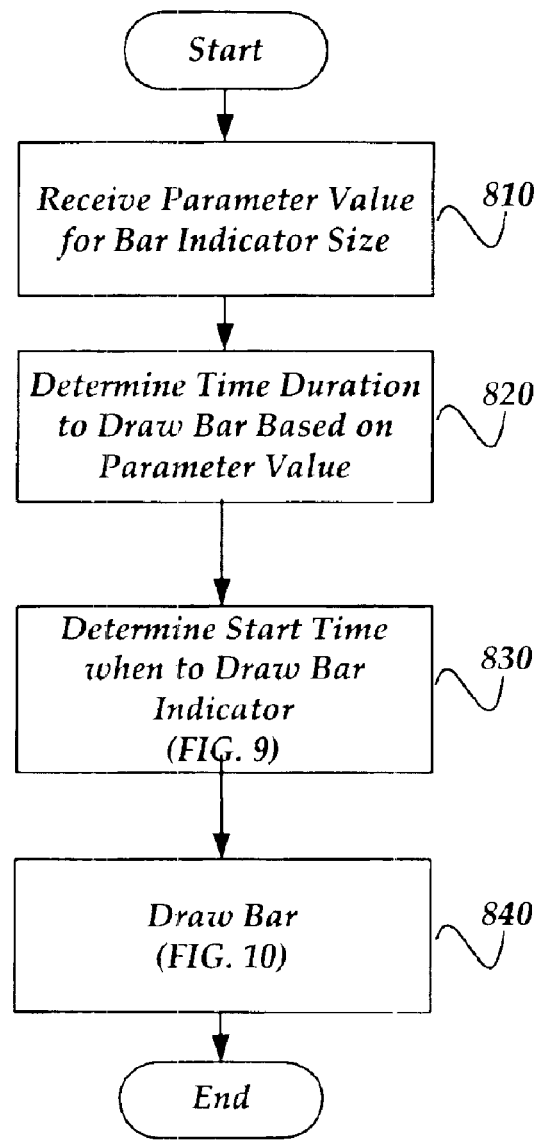
FIG. 8 illustrates an overview logical flow for operation of an OSD bar indicator system.

FIG. 8 illustrates the logical flow for operation of an OSD bar indicator system, according to one embodiment of the invention. After a start block, the logical flow moves to receive the parameter value indicating the bar indicator size at block 810. For example, if the range of value is between 0 and 31, the parameter value may be 16 to indicate that the bar graph should be displayed half way.

Moving to block 820, a determination is made as to how long the OSD logic should be overridden to display the bar graph. The duration time to draw the bar is based on the size of the bar, i.e. the larger the bar, the longer the time duration. According to one embodiment of the invention, the received parameter value is used as the time duration. According to another embodiment, the time duration is obtained by converting an eight-bit value to a five-bit value by using the most significant bits of the eight-bit value.

Figure 9:
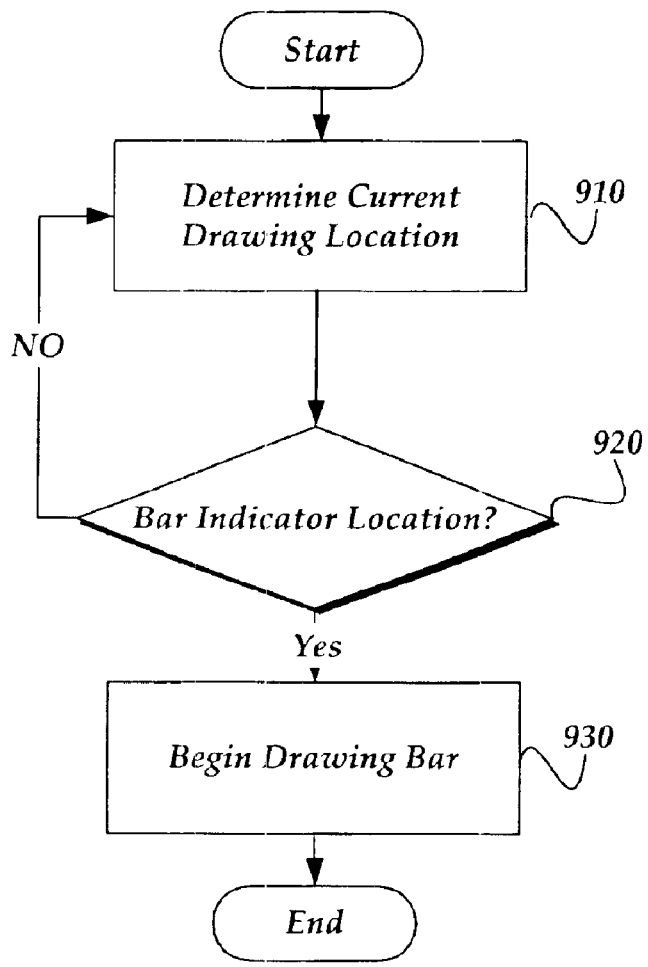
FIG. 9 illustrates a logical flow for determining when to draw the bar indicator.

Transitioning to block 830, a determination is made as when to start drawing the bar indicator on the OSD (See FIG. 9 and related discussion). The start time is generally based on determining when the current drawing position of the OSD is at the start position for the bar indicator.

When it is determined to draw the bar indicator the logic flows to block 840. (See FIG. 10 and related discussion). The logic flow then ends.

FIG. 9 illustrates a logical flow for determining when to draw the bar indicator, according to one embodiment of the invention. After a start block, the logical flow moves to block 910 where the logic determines the current drawing location. The current drawing location is monitored to determine when the drawing address for the OSD reaches the start of the bar indicator.

Transitioning to decision block 920, a determination is made as to whether the current drawing location is the start of the bar indicator location. When the drawing location is not the start of the bar indicator the logic returns to block 910. When the drawing location is the start of the bar indicator the logic flows to block 930 at which point the bar indicator is drawn. The logical flow ends.

Figure 10:
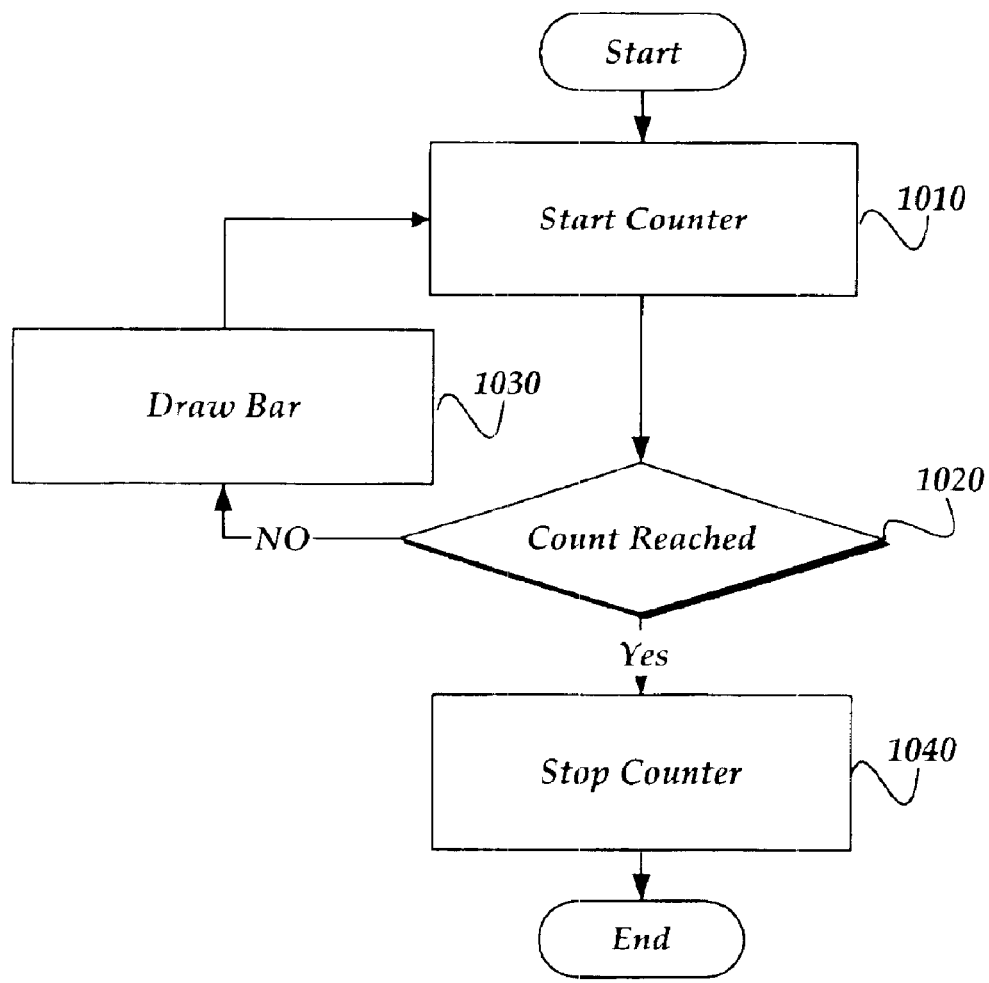
FIG. 10 illustrates a logical flow for drawing the bar indicator the appropriate size.

FIG. 10 illustrates a logical flow for drawing the bar indicator the appropriate size, according to one embodiment of the invention. After a start block, the logic flows to block 1010 where the counter is started. As discussed above, the counter counts to a predetermined value based on the desired size of the bar indicator. Moving to decision block 1030, a determination is made as to whether count has been reached. If the count has not been reached, the logical flow transitions to block 1030 that draws the bar indicator. When the count is reached, the logical flow moves to block 1040, and the counter is stopped. The logical flow moves to an end block and the logic terminates.

Figure 11:
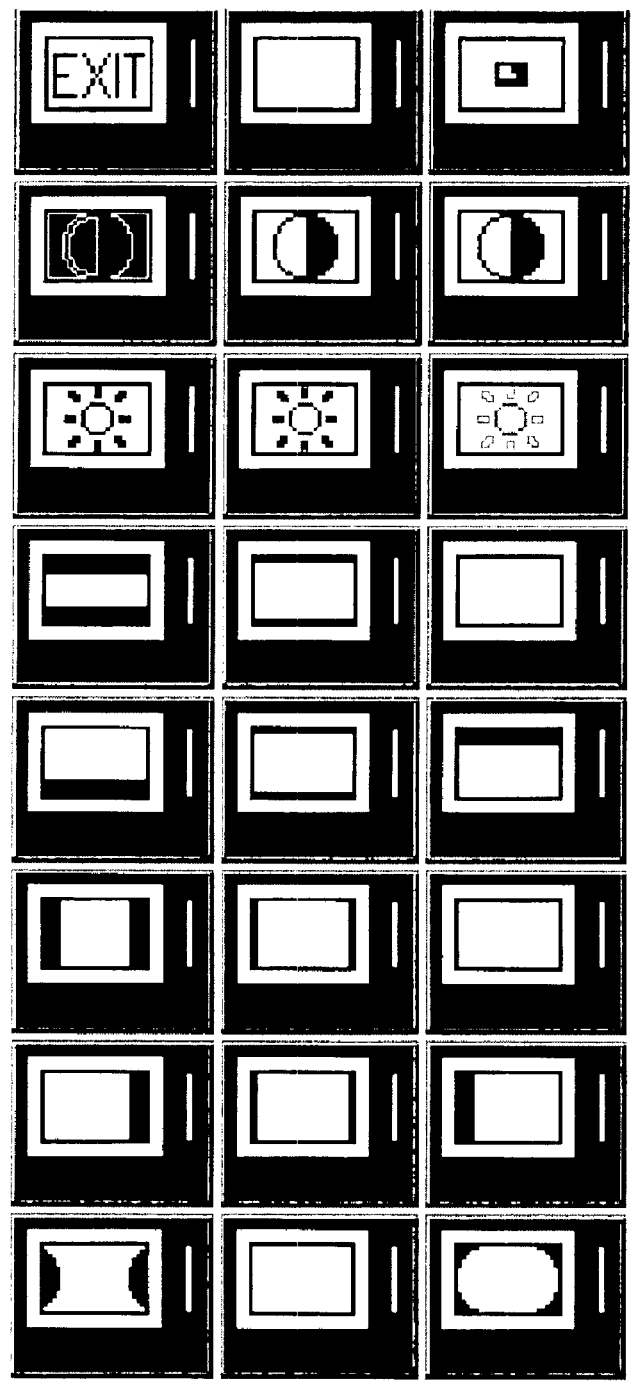
FIGS. 11 and 12 show exemplary icon bitmaps for use in the OSD system.
Figure 12:
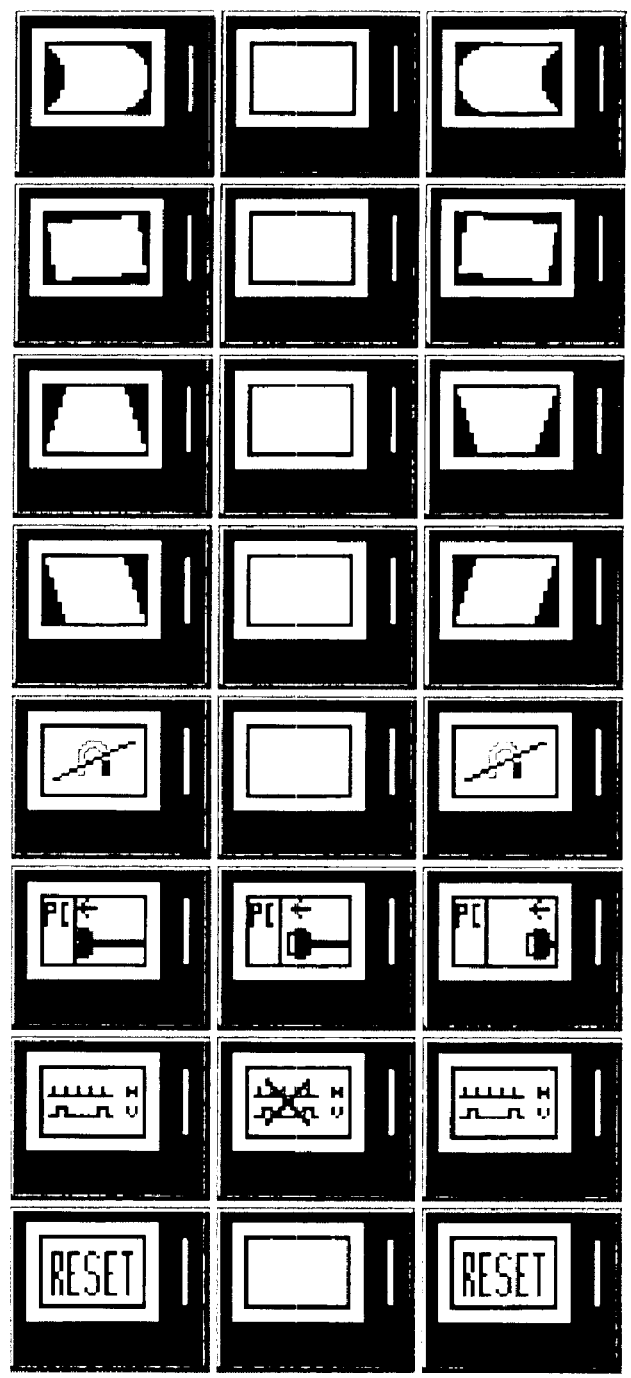

FIGS. 11 and 12 show exemplary icon bitmaps, according to one embodiment of the invention. There are 24 icon bitmaps shown in each figure. According to one embodiment of the invention, these are the initial icon bitmaps for the frames and icons within the OSD system. As will be appreciated, other icon bitmaps may be used depending upon the application.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A low cost bar indicator apparatus for displaying a bar indicator on an on screen display (OSD), comprising:

a bar indicator location circuit arranged to receive an address signal and in response to the address signal produce a found signal;

a timer circuit coupled to the bar indicator location circuit and arranged to receive the found signal, and in response to the found signal produce an override signal; and an OSD logic circuit coupled to the timer circuit and arranged to receive the override signal and arranged to output an overwrite video signal in response to the override signal.

2. The apparatus of claim 1, wherein the address signal is associated with a current drawing location.

3. The apparatus of claim 2, wherein the found signal is produced when the current drawing location is a start position of the bar indicator.

4. The apparatus of claim 1, wherein the timer circuit in response to the found signal produces the override signal for a predetermined time duration.

5. The apparatus of claim 4, wherein, the predetermined time duration is based on a bar indicator size for the bar indicator.

6. The apparatus of claim 5, wherein the predetermined time duration based on the bar indicator size for the bar indicator is based on a time to draw a number of pixels to represent the bar indicator size for the bar indicator.

7. The apparatus of claim 1, wherein the timer circuit further comprises:

a counter circuit arranged to count to a predetermined time duration in response to the found signal; the counter circuit arranged to produce a reset signal when the count has reached the predetermined time duration, and a latch circuit coupled to the counter circuit and arranged to produce the override signal when the latch circuit is in a set state and arranged to reset in response to the reset signal.

8. The apparatus of claim 1 wherein the OSD logic circuit further comprises selectors arranged to output the overwrite video signal when the overwrite signal is a predetermined value.

9. A method for displaying a bar indicator on an OSD, comprising:

receiving a parameter value;

determining a time duration to draw the bar indicator based on the parameter value;

determining a start time to begin drawing the bar indicator; and drawing the bar for the time duration when the start time has been reached.

10. The method of claim 9, wherein determining the time duration to draw the bar indicator based on the parameter value, further comprises determining if the parameter value is within a range of the bar indicator; and if so, setting the time duration to the parameter value; otherwise, transforming the parameter value to be within the range of the bar indicator.

11. The method of claim 10, wherein transforming the parameter value to be within the range of the bar indicator further comprises selecting a number of bits to represent the parameter value.

12. The method of claim 11, wherein determining the start time to begin drawing the bar indicator, further comprises:

determining a current drawing location for the OSD; and starting to draw the bar indicator based on the current drawing location.

13. The method of claim 12, wherein starting to draw the bar indicator based on the current drawing location further comprises determining when the current drawing location is at a start position for the bar indicator.

14. The method of claim 9, wherein drawing the bar for the time duration, further comprises;

starting a counter that counts until a count has been reached; and drawing the bar indicator until the count has been reached.

15. A low cost bar indicator apparatus for displaying a horizontal bar indicator on an OSD, comprising:

an address circuit arranged produce a found signal when a drawing location has been reached by the OSD;

a timer circuit arranged to receive the found signal, and in response to the found signal produce an override signal for a predetermined time duration based on a size of the bar indicator; and an OSD logic circuit arranged to receive the override signal and in response to the override signal select an overwrite video signal for the predetermined time duration.

16. The apparatus of claim 15, wherein the drawing location is a starting point of the bar indicator.

17. The apparatus of claim 16, wherein the timer circuit further comprises:

a counter circuit arranged to count to the predetermined time duration in response to the found signal; the counter circuit arranged to produce a reset signal when the count has reached the predetermined time duration, and a latch circuit coupled to the counter circuit and arranged to produce the override signal when the latch circuit is in a set state and arranged to reset in response to the reset signal.

18. An apparatus for an OSD to display a bar indicator, comprising:

a means for receiving a parameter value;

a means for determining a time duration to draw the bar indicator on the OSD based on the parameter value;

a means for determining a start time to begin drawing the bar indicator; and a means for drawing the bar for the time duration when the start time has been reached.

* * * * *